Aug. 30, 1932.  J. M. LAMMEDEE  1,874,765

GAUGE

Filed Sept. 10, 1930

J. M. Lammedee
INVENTOR.

BY

ATTORNEY.

Patented Aug. 30, 1932

1,874,765

UNITED STATES PATENT OFFICE

JOHN M. LAMMEDEE, OF MORGAN PARK, ILLINOIS

GAUGE

Application filed September 10, 1930. Serial No. 480,854.

This invention relates to gauges and more particularly to a pressure gauge, which is simple in construction, positive and efficient in operation and which will accurately indicate pressure variations in a pressure fluid line.

An object of the present invention is to provide a gauge as specified which obviates the use of gears or geared connection between the pressure responsive member or Bourdon tube and the indicating hand and consequently eliminates the difficulties contingent with the employment of such gears.

More specifically, the present invention comprises a Bourdon tube gauge in which a nonelastic member is connected to the end of the tube and to an arm on the spindle carrying the indicator hand in such manner as positively to impart movement of the tube due to pressure variances to the indicator hand and also to provide suitable restraining means for steadying the movement of the hand and preventing its fluttering upon inconsequential pressure variances.

With these and other objects in view, as may appear from the accompanying specification, the invention consists of various features of construction and combination of parts which will be first described in connection with the accompanying drawing showing a gauge of the preferred form embodying the invention and the features forming the invention will be specifically pointed out in the claims.

In the drawing

Figure 1:
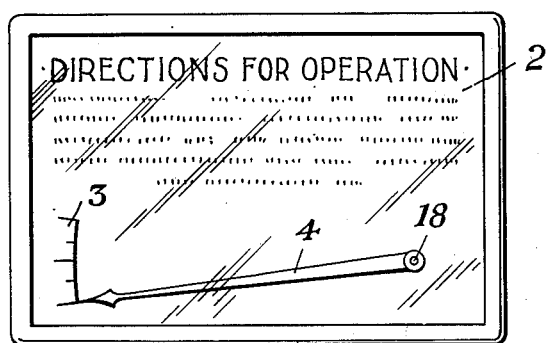
Fig. 1 is a front view of the gauge.

Referring more specifically to the drawing, the gauge includes a casing 1, which is shown rectangular in shape but which may be of any desired shape without departing from the spirit of this invention.

The casing 1 of the gauge has a dial 2 carried thereby, suitably connected to the casing and carrying indicia, as indicated at 3, for showing or indicating pressure variances in a pressure line. An indicator hand 4 cooperates with the scale or indicia 3, and is mounted for pivotal movement upon the tapered end 18 of the spindle 5 carried by the supporting blocks 15 and 15a mounted in the casing 1.

A Bourdon tube 6 is placed in the casing and has connection with a pressure fluid line through a nipple 7. The Bourdon tube 6, is, of the usual construction of such tubes, that is, a hollow tube of suitable shape and material and is bowed or curved in such manner that pressure variances in the fluid entering the tube through the nipple 7, will move the free end 8 of the tube through varying distances caused by the straightening action in consequence of fluid pressure in the tube, the return action of the tube to its normal shape being due to its internal tension. The free end 8 of the tube 6, has a lug 9 attached thereto to which a rod 10 is pivotally connected through the medium of the coupling 11 and the pivot pin 12.

The rod 10 is shown adjustably connected also, by means of a second coupling 11a to an arm 14 which is in turn a part of the spindle 5 mounted in the supporting blocks 15 and 15a and to which spindle the indicating hand 4 is connected by means of friction contact with the tapered end of the spindle 18. The rod 10 being shown as adjustably connected at both ends, is held in adjusted position by means of the lock nuts 16 and 16a. The tapered pin or stem 18 being a continuation of the spindle 5 extends through a hole 17 in the dial 2 and on it is mounted the indicating hand 4. The length of the arm 14 is determined in accordance with the length of the hand and the movement of the free end of the Bourdon tube so as to impart proper degrees of movement to the indicator hand.

Figure 2:
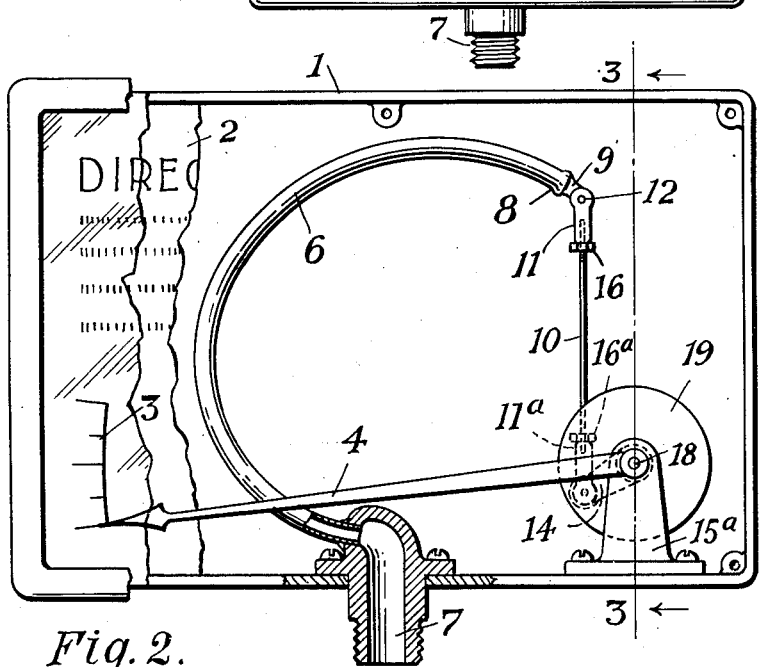
Fig. 2 is a view showing the construction of the gauge.
Figure 3:
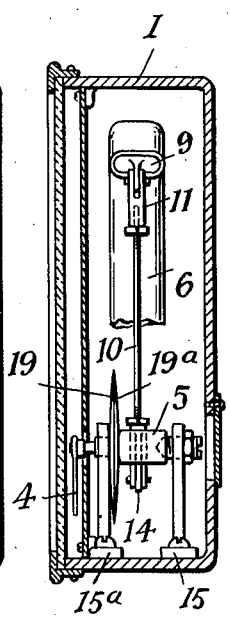
Fig. 3 is a vertical section through the gauge taken on the line 3—3 of Fig. 2.
Figure 4:
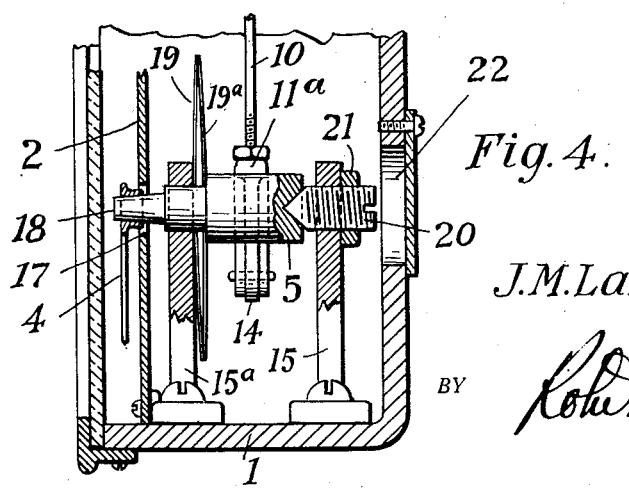
Fig. 4 is an enlarged sectional detail taken on line 3—3 of Fig. 2.

A pair of friction discs 19 and 19a are held in working relationship by being attached respectively to the inner side of the supporting block 15a and to the adjacent shoulder on the spindle 5, this for the purpose of dampening undesired oscillations of the gauge hand. Adjustment of the tension on these discs may be effected by means of the adjusting screw 20 threaded into the supporting block 15 and held in adjustment by means of the lock nut 21. Access to this adjustment may be had through a shrouded opening in the back of the case 1 as shown at 22 in the drawing Figure 2. The arrangement of the adjusting mechanism is clearly shown in detail in Figure 4.

In Fig. 1 of the drawing it will be noted that the indicia or scale 3 is positioned in one corner of the dial 2 and that the indicator hand 4 also is pivoted at one side of the dial thereby leaving the greater portion of the surface of the dial free to receive the imprint of directions for the operation of the machine or apparatus in connection with which the gauge is used.

From the foregoing description taken in connection with the accompanying drawing, it will appear that a pressure gauge has been provided which is simple in construction and which eliminates gear and similar types of complicated connections which have a tendency to suffer damage through rough usage of the gauge.

It will be understood that the invention is not to be limited to the specific construction or arrangement of parts shown but that they maye be widely modified within the invention defined by the claims.

What is claimed is:

1. In a pressure gauge, the combination of a Bourdon tube, an indicator hand, a spindle for pivotally mounting said hand, a rigid, non-elastic member connected to the free end of said tube and to said spindle for imparting movement of the tube to the hand, said member being adjustably connected at least at one end to permit adjustment of the connection between the indicator hand and Bourdon tube, supporting blocks for said spindle, a pair of friction discs held in working relationship by being connected respectively one to one of said supporting blocks and the other to said spindle, said friction discs dampening oscillation of said hand, and means for adjusting the tension between said discs.

2. In a pressure gauge, the combination of a Bourdon tube, an indicator hand, a spindle for pivotally mounting said hand, a rigid, non-elastic member connected to the free end of said tube and to said spindle for imparting movement of the tube to the hand, said member being adjustably connected at least at one end to permit adjustment of the connection between the indicator hand and Bourdon tube, supporting blocks for said spindle, a pair of friction discs held in working relationship by being connected respectively one to one of said supporting blocks and the other to said spindle, said friction discs dampening oscillation of said hand, and means for adjusting the tension between said discs, a dial having a scale thereon, said spindle and indicating hand being positioned at one side of the dial, and said dial being of such size that the hand moves only over a small portion thereof in its complete scope of movement, thereby leaving a relatively greater portion of the surface of the dial free to receive the imprint of instructions or other printed matter thereon.

In testimony whereof I affix my signature.

JOHN M. LAMMEDEE.